(12) United States Patent
Fujiwara et al.

(10) Patent No.: US 9,287,910 B2
(45) Date of Patent: Mar. 15, 2016

(54) ELECTROMAGNETIC RESONANCE COUPLER AND TRANSMISSION APPARATUS

(71) Applicant: Panasonic Intellectual Property Management Co., Ltd., Osaka (JP)

(72) Inventors: Hideaki Fujiwara, Gifu (JP); Osamu Tabata, Gifu (JP); Shuichi Nagai, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/676,816

(22) Filed: Apr. 2, 2015

(65) Prior Publication Data

US 2015/0295599 A1 Oct. 15, 2015

(30) Foreign Application Priority Data

Apr. 15, 2014 (JP) .................. 2014-084037

(51) Int. Cl.
| | |
|---|---|
| *H04B 5/00* | (2006.01) |
| *H04B 1/04* | (2006.01) |
| *H01P 1/203* | (2006.01) |
| *H01P 5/02* | (2006.01) |
| *H01P 7/08* | (2006.01) |
| *H04B 1/18* | (2006.01) |

(52) U.S. Cl.
CPC .......... *H04B 1/0475* (2013.01); *H01P 1/20345* (2013.01); *H01P 5/028* (2013.01); *H01P 7/084* (2013.01)

(58) Field of Classification Search
CPC ..... H01P 1/20345; H01P 5/028; H01P 7/084; H04B 1/0475
USPC ............................................ 455/41.1, 193.2
See application file for complete search history.

(56) References Cited

U.S. PATENT DOCUMENTS

| | | | |
|---|---|---|---|
| 9,104,952 B2 * | 8/2015 | Lawrence et al. | |
| 2006/0250155 A1 | 11/2006 | Chen et al. | |
| 2014/0049345 A1 | 2/2014 | Nagai | |

FOREIGN PATENT DOCUMENTS

| | | |
|---|---|---|
| JP | 11-355008 | 12/1999 |
| JP | 2001-144452 | 5/2001 |
| JP | 2001-339266 | 12/2001 |
| JP | 2006-033614 | 2/2006 |
| JP | 2008-067012 | 3/2008 |
| JP | 2009-033624 | 2/2009 |
| JP | 2009-246810 | 10/2009 |
| JP | 2013-143675 | 7/2013 |
| WO | 2013/065238 | 5/2013 |

* cited by examiner

*Primary Examiner* — Eugene Yun
(74) *Attorney, Agent, or Firm* — McDermott Will & Emery LLP

(57) ABSTRACT

An electromagnetic resonance coupler according to one aspect of the present disclosure includes a first layer, a second layer which faces a first principal surface of the first layer, a third layer which faces a second principal surface of the first layer, a first resonator which is located between the first layer and the second layer, and a second resonator which is located between the first layer and the third layer. A dielectric constant of the first layer is lower than either one of a dielectric constant of the second layer and a dielectric constant of the third layer. A dielectric dissipation factor of the first layer is higher than either one of a dielectric dissipation factor of the second layer and a dielectric dissipation factor of the third layer.

15 Claims, 14 Drawing Sheets

ELECTROMAGNETIC RESONANCE COUPLER AND TRANSMISSION APPARATUS

BACKGROUND

1. Technical Field

The present disclosure relates to an electromagnetic resonance coupler and a transmission apparatus including the electromagnetic resonance coupler.

2. Description of the Related Art

There is known a non-contact transmission technique for transmitting power and signals between a plurality of electrical devices.

Japanese Unexamined Patent Application Publication No. 2008-067012 and International Publication No. 2013/065238 disclose an electromagnetic resonance coupler which causes two resonators to couple together through electromagnetic resonant coupling to transmit a radio-frequency signal.

SUMMARY

An electromagnetic resonance coupler may propagate noise, such as common mode noise.

One non-limiting and exemplary embodiment provides an electromagnetic resonance coupler and a transmission apparatus capable of inhibiting noise propagation.

An electromagnetic resonance coupler according to one aspect of the present disclosure includes: a first layer including a first principal surface and a second principal surface opposite to the first principal surface, the first layer having a first dielectric constant and a first dielectric dissipation factor; a second layer facing the first principal surface of the first layer, the second layer having a second dielectric constant higher than the first dielectric constant and a second dielectric dissipation factor lower than the first dielectric constant; a third layer facing the second principal surface of the first layer, the third layer having a third dielectric constant higher than the first dielectric constant and a third dielectric dissipation factor lower than the first dielectric constant; a first resonator located between the first layer and the second layer, the first resonator having a planar shape; and a second resonator located between the first layer and the third layer, the second resonator having a planar shape.

The electromagnetic resonance coupler according to one aspect can inhibit noise propagation.

It should be noted that comprehensive or specific embodiments may be implemented as a transmission apparatus, a power conversion apparatus, a transmission system, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
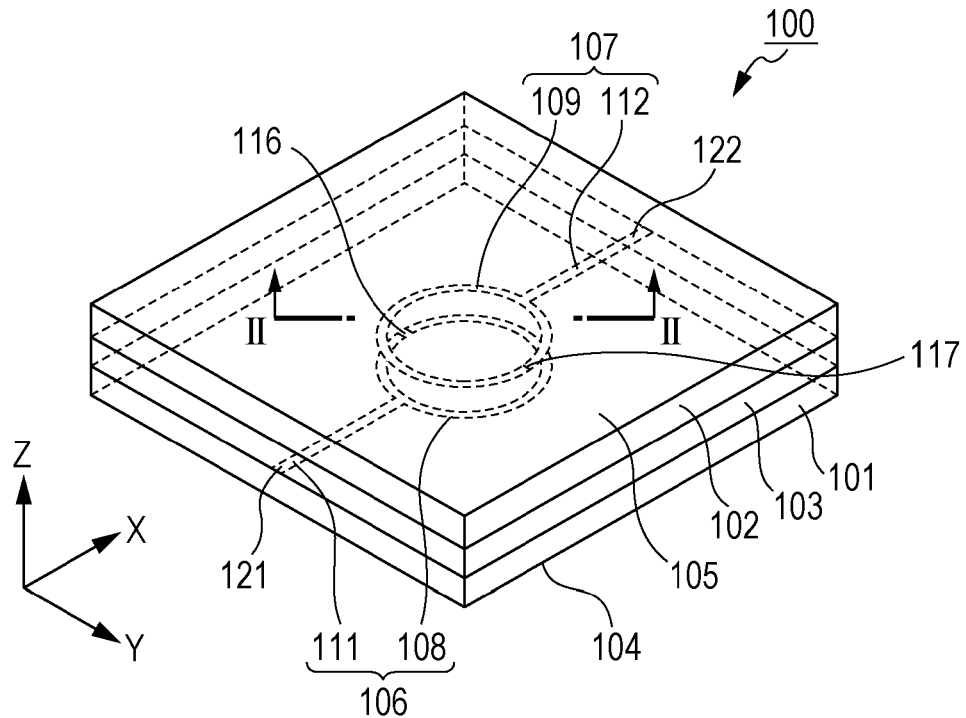
FIG. 1 is a perspective view showing an example of the configuration of an electromagnetic resonance coupler according to a first embodiment.

Underlying Knowledge Forming Basis of the Present Disclosure

A transmission apparatus includes a sender which sends a transmission signal, an electromagnetic resonance coupler which contactlessly transmits the transmission signal, and a receiver which receives the transmission signal. The transmission apparatus is used as, for example, a gate driving apparatus. A gate driving apparatus drives a power semiconductor switching element. In the gate driving apparatus, a primary side which generates a transmission signal and a secondary side which is connected to a power semiconductor switching element are isolated in direct current from each other.

If the gate driving apparatus drives a large number of semiconductor switching elements, the gate driving apparatus includes a large number of electromagnetic resonance couplers. In this case, the gate driving apparatus is expected to be miniaturized or integrated.

For miniaturization of the gate driving apparatus, for example, a power source line or the like is arranged near resonators constituting each electromagnetic resonance coupler. In this case, there are concerns about entry of noise into the resonators and/or radio emission from the resonators to the outside of the electromagnetic resonance coupler. To address such concerns, for example, one pair of metal shields is arranged at the upper and lower sides of one pair of resonators. With these metal shields, the resonators are shielded. One of the metal shields is equipotentially connected to a primary-side ground while the other is equipotentially connected to a secondary-side ground.

In this configuration, however, the wiring area of a primary-side circuit including the one metal shield and the wiring area of a secondary-side circuit including the other metal shield are large. For example, if common mode noise enters the primary-side resonator and the primary-side ground, the noise is likely to propagate to the secondary side.

In order to solve the above-described problem, the present inventors have made keen examination and have found an electromagnetic resonance coupler according to the present disclosure. Note that the present disclosure is not limited to the description above.

Overview of Embodiments

An electromagnetic resonance coupler according to one aspect of the present disclosure includes a first layer which includes a first principal surface and a second principal surface on a side opposite to the first principal surface, a second layer which faces the first principal surface of the first layer, a third layer which faces the second principal surface of the first layer, a first resonator which is located between the first layer and the second layer, and a second resonator which is located between the first layer and the third layer. the first and second resonators each have a planar shape. A dielectric constant of the first layer is lower than either one of a dielectric constant of the second layer and a dielectric constant of the third layer. A dielectric dissipation factor of the first layer is higher than either one of a dielectric dissipation factor of the second layer and a dielectric dissipation factor of the third layer.

With this configuration, noise propagation can be inhibited.

For example, the first layer, the second layer, and the third layer may be dielectric layers. For example, the dielectric constant of the first layer may be higher than 1.

With this configuration, the dielectric constant of the first layer is higher than a dielectric constant of air. This can enhance transmission efficiency and broadens a transmission signal band. Since the layers are dielectric layers, they are resistant to moisture and the like, enhancing reliability of the electromagnetic resonance coupler.

For example, the first layer, the second layer, and the third layer may each include a resin layer and a filler which is dispersed in the resin layer and is higher in dielectric constant than the resin layer. A volume fraction of the filler in the first layer may be smaller than either one of a volume fraction of the filler in the second layer and a volume fraction of the filler in the third layer.

For example, the second layer and the third layer may each include a resin layer and a filler which is dispersed in the resin layer and is higher in dielectric constant than the resin layer. For example, the first layer may include a resin layer and may not include a filler. With this configuration, the first layer may be composed of an inexpensive material, which allows reduction in manufacturing cost.

The first layer may include a plurality of dielectric layers different in dielectric constant.

With this configuration, the first layer includes discontinuous surfaces. An electric discharge may be more unlikely to occur between the second layer and the third layer than in a case where the first layer is single-layered.

The first layer may include a plurality of dielectric layers equal in dielectric constant.

The electromagnetic resonance coupler may further include, for example, a fourth layer which is located between the second layer and the first resonator or between the first layer and the first resonator and a fifth layer which is located between the third layer and the second resonator or between the first layer and the second resonator. The dielectric constant of the first layer may be lower than either one of a dielectric constant of the fourth layer and a dielectric constant of the fifth layer.

With this configuration, an operating frequency can be reduced, which allows miniaturization of the electromagnetic resonance coupler.

For example, the dielectric constant of the fourth layer may be higher than the dielectric constant of the second layer, and the dielectric constant of the fifth layer may be higher than the dielectric constant of the third layer.

The electromagnetic resonance coupler may include, for example, a fourth layer which is located between the second layer and the first resonator, a fifth layer which is located between the third layer and the second resonator, a sixth layer which is located between the first layer and the first resonator, and a seventh layer which is located between the first layer and the second resonator. The dielectric constant of the first layer may be lower than any one of a dielectric constant of the fourth layer, a dielectric constant of the fifth layer, a dielectric constant of the sixth layer, and a dielectric constant of the seventh layer.

With this configuration, the operating frequency can be further reduced, which allows further miniaturization of the electromagnetic resonance coupler.

The dielectric constant of the fourth layer and the dielectric constant of the sixth layer may each be higher than, for example, the dielectric constant of the second layer. The dielectric constant of the fifth layer and the dielectric constant of the seventh layer may each be higher than, for example, the dielectric constant of the third layer.

The electromagnetic resonance coupler may further include, for example, a first ground layer which is located on a side of the second layer that is opposite to a side facing the first layer and a second ground layer which is located on a side of the third layer that is opposite to a side facing the first layer.

The electromagnetic resonance coupler may include a metal housing which surrounds the first layer, the second layer, the first resonator, the second resonator, the first ground layer, and the second ground layer. The metal housing may be grounded.

The first resonator may include, for example, a first wire, a first input wire which is connected to a first connection of the first wire, and a second input wire which is connected to a second connection of the first wire. The first wire may be connected to the first ground layer between the first connection and the second connection in the first wire. The second resonator may include, for example, a second wire, a first output wire which is connected to a third connection of the second wire, and a second output wire which is connected to a fourth connection of the second wire. The second wire may be connected to the second ground layer between the third connection and the fourth connection in the second wire.

With this configuration, one electromagnetic resonance coupler can individually transmit two transmission signals in a non-contact manner.

The first wire may have, for example, a loop shape which is partially open. The second wire may have, for example, a loop shape which is partially open.

For example, a region which is surrounded by an outer peripheral contour of the first wire and a region which is surrounded by an outer peripheral contour of the second wire may coincide with each other when viewed from a direction perpendicular to the first principal surface. For example, the first wire and the second wire may be symmetric with respect to a point when viewed from a direction perpendicular to the first principal surface.

For example, the electromagnetic resonance coupler may isolatedly transmit a transmission signal from one of the first resonator and the second resonator to the other of the first resonator and the second resonator. A distance between the first resonator and the second resonator may be not more than one-half of a wavelength of the transmission signal.

A transmission apparatus according to one aspect of the present disclosure includes an electromagnetic resonance coupler according to any one of the above-described aspects, a sender which generates the transmission signal by modulating a radio-frequency wave in accordance with an input signal and sends the transmission signal to the first resonator, and a receiver which generates an output signal by rectifying the transmission signal output from the second resonator.

Embodiments of the present disclosure will be described below with reference to the drawings.

Note that the embodiments to be described below are all comprehensive or specific examples of the present disclosure. Numerical values, shapes, materials, constituent elements, the positions of and the form of connection between the constituent elements, steps, the order of the steps, and the like described in the embodiments below are merely illustrative, and are not intended to limit the present disclosure. Among the constituent elements in the embodiments below, those not described in an independent claim representing a top-level concept will be described as optional constituent elements. Note that the drawings are schematic and not necessarily to scale.

First Embodiment

Overall Structure

The overall structure of an electromagnetic resonance coupler according to a first embodiment will be described.

Figure 2:
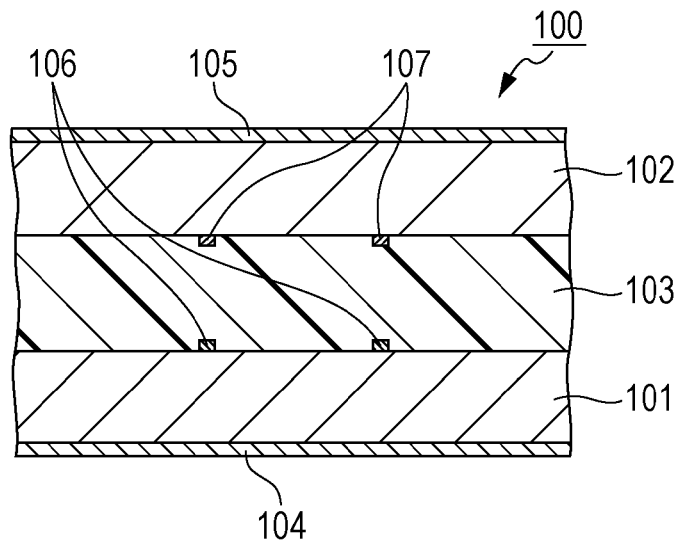
FIG. 2 is a cross-sectional view of the electromagnetic resonance coupler shown in FIG. 1 taken along a plane containing line II-II and perpendicular to a principal surface of a substrate.

FIG. 1 is a perspective view showing an example of the configuration of an electromagnetic resonance coupler 100. FIG. 2 is a cross-sectional view of the electromagnetic resonance coupler 100 shown in FIG. 1 taken along a plane containing line II-II and perpendicular to a principal surface of a substrate.

The electromagnetic resonance coupler 100 includes one pair of resonators. The one pair of resonators contactlessly transmits a transmission signal. The electromagnetic resonance coupler 100 contactlessly transmits an AC signal at, for example, 6.0 GHz. In the present disclosure, the frequency of radio-frequency waves input to the electromagnetic resonance coupler 100 may be called an "operating frequency", and a value as a wavelength, to which the operating frequency is converted, may be called an "operating wavelength". Note that wavelength shortening rates of various materials are taken into account in the conversion. Thus, in the example shown in FIG. 1, the operating frequency of the electromagnetic resonance coupler 100 is 6.0 GHz.

The electromagnetic resonance coupler 100 includes a sending substrate 101, a reception substrate 102 which is located above the sending substrate 101, and a low-dielectric layer 103 which is located between the sending substrate 101 and the reception substrate 102. Note that the sending substrate 101 is an example of a second layer, the reception substrate 102 is an example of a third layer, and the low-dielectric layer 103 is an example of a first layer. In the present disclosure, a Z-axis positive direction in each drawing may be called the term "upper", and a Z-axis negative direction may be called the term "lower", for sake of simplicity. The Z-axis positive and negative directions are substantially perpendicular to a principal surface of the sending substrate 101. Note that the terms "upper" and "lower" are not intended to limit the order of stacking at the time of manufacture or an attachment direction before use.

The sending substrate 101 and the reception substrate 102 are high-dielectric substrates. A high-dielectric substrate is formed by, for example, mixing a filler into a resin material. The dielectric constant of a high-dielectric substrate is, for example, about 10. The thicknesses of the sending substrate 101 and the reception substrate 102 are, for example, 0.2 mm. Note that the sending substrate 101 and the reception substrate 102 may be non-resin substrates, such as a sapphire substrate.

A sending resonator 106 is disposed on an upper surface of the sending substrate 101. The sending resonator 106 includes an input wire 111 and a first resonance wire 108 in a circular shape. The first resonance wire 108 has the shape of an open ring having a sending-side slit 116. The first resonance wire 108 is connected to one end of the input wire 111. The other end of the input wire 111 is an input terminal 121. Note that the sending resonator 106 is an example of a first resonator, the first resonance wire 108 is an example of a first wire, and the sending-side slit 116 is an example of an opening.

The planar ground 104 is located on a lower side of the sending substrate 101. The planar ground 104 is, for example, a metal film. The planar ground 104 gives a signal reference potential to the wires on the sending substrate 101. Note that the planar ground 104 is an example of a first ground layer.

A reception resonator 107 is disposed on a lower surface of the reception substrate 102. The reception resonator 107 includes an output wire 112 and a second resonance wire 109 in a circular shape. The second resonance wire 109 has the shape of an open ring having a receiving-side slit 117. The second resonance wire 109 is connected to one end of the output wire 112. The other end of the output wire 112 is an output terminal 122. In the electromagnetic resonance coupler 100 shown in FIG. 1, the reception resonator 107 is identical in size and shape to the sending resonator 106. Note that the reception resonator 107 is an example of a second resonator, the second resonance wire 109 is an example of a second wire, and the receiving-side slit 117 is an example of an opening.

The planar ground 105 is located on an upper side of the reception substrate 102. The planar ground 105 is, for example, a metal film. The planar ground 105 gives a signal reference potential to the wires on the reception substrate 102. Note that the planar ground 105 is an example of a second ground layer. The planar ground 104 and the planar ground 105 are electrically isolated from each other.

The materials for the wires on the sending substrate 101 and the planar ground 104 and the materials for the wires on the reception substrate 102 and the planar ground 105 are, for example, gold. Any other metal material may be used.

The low-dielectric layer 103 is formed by, for example, mixing a filler into a resin material. For example, the percentage of a filler to be mixed in the low-dielectric layer 103 is lower than those in the materials for the sending substrate 101 and the reception substrate 102. The low-dielectric layer 103 is lower in dielectric constant than the sending substrate 101 and the reception substrate 102. The dielectric constant of the low-dielectric layer 103 is, for example, not more than one-third of those of the sending substrate 101 and the reception substrate 102 and is, for example, 3.1. With this configuration, the electromagnetic resonance coupler 100 can inhibit noise from propagating from the sending substrate side to the reception substrate side.

If the sending substrate 101 and the reception substrate 102 are made of a resin material, the material may be CS-3396 from RISHO KOGYO CO., LTD. The material is highly filled with a high-dielectric-constant inorganic filler, has a dielectric constant of 10 at a frequency of 10 GHz and a temperature of 23° C., and has a dielectric dissipation factor of 0.003 at 1 GHz. If the low-dielectric layer 103 is made of a resin material, the material may be, for example, ES-3317B from RISHO KOGYO CO., LTD. The material has a dielectric constant of 3.4 at a frequency of 1 GHz. Alternatively, the resin material of the low-dielectric layer 103 may be, for example, general-purpose Flame Retardant Type 4 (FR4) or ES-3305 from RISHO KOGYO CO., LTD.

The low-dielectric layer 103 may be higher in dielectric dissipation factor than the sending substrate 101 and the reception substrate 102. If the dielectric dissipation factor of a dielectric layer between a reception side and a sending side is high in a conventional non-contact transmission system utilizing capacitive coupling or electromagnetic inductive coupling, a signal transmission loss may become large, and a signal may fail to be appropriately transmitted. In contrast, since the electromagnetic resonance coupler 100 utilizes electromagnetic resonant coupling, the electromagnetic resonance coupler 100 is relatively less affected by a transmission loss caused by the low-dielectric layer 103 even if the dielectric dissipation factor of the low-dielectric layer 103 is high. Additionally, if the dielectric dissipation factor of the low-dielectric layer 103 is high in the electromagnetic resonance coupler 100, capacitance is reduced, which inhibits noise propagation due to capacitive coupling.

For example, the low-dielectric layer 103 may not contain a filler. The absence of a filler allows reduction in the cost of the material for the low-dielectric layer 103. In this case, the low-dielectric layer 103 can be lower in dielectric constant and be higher in dielectric dissipation factor than the sending substrate 101 and the reception substrate 102. With this configuration, the electromagnetic resonance coupler 100 can appropriately maintain the strength of a transmitted signal while inhibiting noise propagation.

The low-dielectric layer 103 has, for example, flexibility. In this case, in manufacturing, the low-dielectric layer 103 may be heated while being sandwiched between the sending substrate 101 and the reception substrate 102, and then be pressed in a stacking direction. With this heating and pressing, the low-dielectric layer 103 is formed in a shape along the sending resonator 106 and the reception resonator 107, as shown in FIG. 2. That is, the low-dielectric layer 103 fills a space between the sending substrate 101 and the reception substrate 102 so as not to form a gap. The thickness of the low-dielectric layer 103 is, for example, 0.2 mm.

[Shape of Resonator]

An example of the shape of the sending resonator 106 and an example of the shape of the reception resonator 107 will be described in detail.

Figure 3:
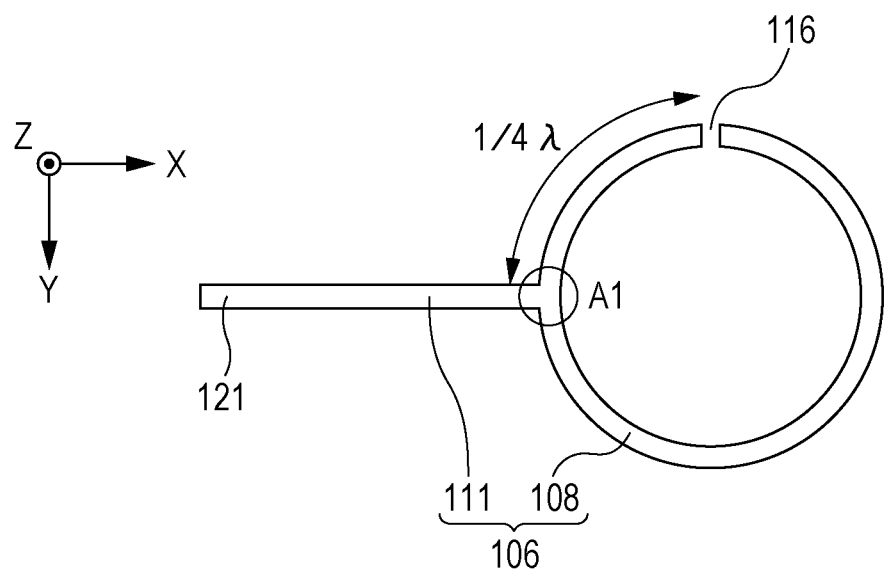
FIG. 3 is a top view of a sending resonator shown in FIG. 1.

The sending resonator 106 will be described first. FIG. 3 is a top view of the sending resonator 106.

In the example shown in FIG. 3, the first resonance wire 108 has a substantially circular shape having a diameter of about 3 mm and is partially opened by the sending-side slit 116. The circumferential length of the first resonance wire 108 corresponds to, for example, one-half of the operating wavelength of the electromagnetic resonance coupler 100. The wiring width of the sending resonator 106 is, for example, about 0.1 mm.

The input wire 111 is a linear wire extending in an X direction. The wiring width of the input wire 111 is, for example, about 0.1 mm. The one end of the input wire 111 is connected to a first connection A1 of the first resonance wire 108. A wiring length from one end of the first resonance wire 108 to the first connection A1 corresponds to one-fourth of the overall wiring length of the first resonance wire 108. One-fourth of the wiring length corresponds to about one-eighth of the operating wavelength of the electromagnetic resonance coupler 100. Note that the first resonance wire 108 and the input wire 111 are physically connected to each other in the example shown in FIG. 3. Note that the first resonance wire 108 and the input wire 111 may not be physically connected and may be electrically connected.

The other end of the input wire 111 is the input terminal 121, to which a transmission signal is input.

Figure 4:
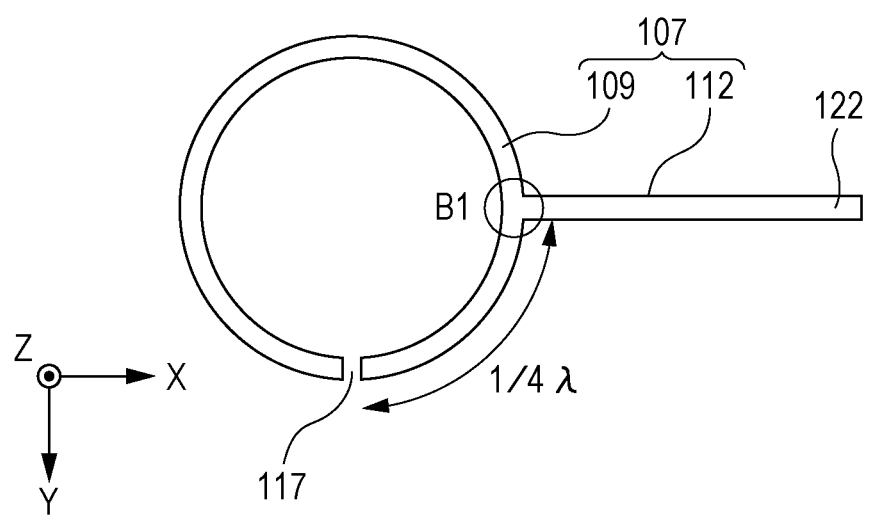
FIG. 4 is a top view of a reception resonator shown in FIG. 1.

The reception resonator 107 will be described next. FIG. 4 is a top view of the reception resonator 107.

In the example shown in FIG. 4, the second resonance wire 109 has a substantially circular shape having a diameter of about 3 mm and is partially opened by the receiving-side slit 117. The circumferential length and the wiring width of the second resonance wire 109 are the same as those of the first resonance wire 108.

The output wire 112 is a linear wire extending in the X direction. The wiring width of the output wire 112 is, for example, about 0.1 mm. The one end of the output wire 112 is connected to a second connection B1 of the second resonance wire 109. A wiring length from one end of the second resonance wire 109 to the second connection B1 corresponds to one-fourth of the overall wiring length of the second resonance wire 109.

The other end of the output wire 112 is the output terminal 122, from which a transmission signal is output.

Note that the position of the first connection A1 in the first resonance wire 108 may be adjusted in view of input impedance, manufacturing variations, and the like. For this reason, the position of the first connection A1 may not exactly coincide with the position as shown in FIG. 3.

Similarly, the position of the second connection B1 in the second resonance wire 109 may be adjusted in view of output impedance, manufacturing variations, and the like. For this reason, the position of the second connection B1 may not exactly coincide with the position as shown in FIG. 4.

In view of impedance, the wiring width of the output wire 112 may be larger than that of the input wire 111. For example, the wiring width of the input wire 111 may be about 0.1 mm, and the wiring width of the output wire 112 may be about 0.2 mm. Note that the wiring widths of the input wire 111 and the output wire 112 are not limited to these examples.

[Positional Relationship between Resonators]

The shape of the sending resonator 106 and the positional relationship with the reception resonator 107 will be described.

In the example shown in FIG. 1, contours of the first resonance wire 108 and contours of the second resonance wire 109 coincide with each other except for the slits and the connections when viewed from a direction perpendicular to the principal surface of the sending substrate 101. The first resonance wire 108 and the second resonance wire 109 are symmetric with respect to a point when viewed from the direction perpendicular to the principal surface of the sending substrate 101.

The contours of each wire in the shape of an open ring include an inner peripheral contour and an outer peripheral contour. An outer peripheral contour of the first resonance wire 108 and an outer peripheral contour of the second resonance wire 109 may coincide with each other except for the slits. In other words, for example, the shapes of the resonance wires may be different inside regions surrounded by the outer peripheral contours of the resonance wires. The phrase "coincide" means coinciding, except for openings and connections, within the margin of manufacturing variations.

In the example shown in FIG. 1, the distance between the sending resonator 106 and the reception resonator 107 is substantially equal to the thickness of the low-dielectric layer 103. The distance is not more than one-half of the operating wavelength of the electromagnetic resonance coupler 100. Under these conditions, the sending resonator 106 and the reception resonator 107 couple together through electromagnetic resonant coupling in a near-field region.

Note that the distance between the sending resonator 106 and the reception resonator 107 is not limited to the above-described one. Even if the distance in the stacking direction between the sending resonator 106 and the reception resonator 107 is larger than one-half of the operating wavelength, the electromagnetic resonance coupler 100 is operable. The electromagnetic resonance coupler 100, however, operates more effectively if the distance between the sending resonator 106 and the reception resonator 107 is not more than one-half of a value as a wavelength, to which the frequency of a radio-frequency wave to be transmitted is converted.

[Operation]

The operation of the electromagnetic resonance coupler 100 will be described.

A transmission signal input from the input terminal 121 is input to the first resonance wire 108 through the input wire 111. The transmission signal is, for example, a modulated signal obtained when a radio-frequency wave at 6.0 GHz is amplitude-modulated in accordance with a predetermined input signal.

A radio-frequency wave input to the sending resonator 106 resonates inside the first resonance wire 108. This excites an electromagnetic field near the first resonance wire 108. As a result, a radio-frequency wave resonates inside the second resonance wire 109 that is coupled to the first resonance wire 108 through electromagnetic resonant coupling. In this manner, the transmission signal is contactlessly transmitted from the first resonance wire 108 to the second resonance wire 109 and then is output from the output terminal 122.

Note that the entire length of each of the first resonance wire 108 and the second resonance wire 109 may be set to an integral multiple of one-half of the operating wavelength.

[Inhibitory Effect on Noise Propagation]

An inhibitory effect on noise, e.g., common mode noise, which propagates mainly via a capacitance component between the resonators in the electromagnetic resonance coupler 100 will be described.

Letting ∈1 be the dielectric constant of the sending substrate 101; ∈2, the dielectric constant of the reception substrate 102; and ∈3, the dielectric constant of the low-dielectric layer 103, the present inventors performed electromagnetic field simulations for the five cases below. Note that simulation conditions except for the dielectric constants ∈1, ∈2, and ∈3 were the same in the following five cases.

Case A: ∈1=∈2=∈3=10
Case B: ∈1=∈2=10 and ∈3=3.1
Case C: ∈1=3.1 and ∈2=∈3=10, or ∈2=3.1 and ∈1=∈3=10
Case D: ∈1=∈2=3.1 and ∈3=10
Case E: ∈1=∈2=∈3=3.1

Case A corresponds to a conventional electromagnetic resonance coupler.

Case B corresponds to the electromagnetic resonance coupler 100. In case B, noise propagation was inhibited to about one-hundredth of that in case A.

In case C, noise propagation is almost comparable to that in case A.

In case D, noise propagation was about one-half of that in case A.

In case E, noise propagation was reduced such that the amount of noise was about 60% of that in case B. However, the wiring length of each resonance wire in case E is 50% or more larger than that in case B, when an operating wavelength is the same. That is, miniaturization is difficult in case E.

As can be seen from the simulation results above, the electromagnetic resonance coupler 100 corresponding to case B is comparable in size to the conventional one but can greatly inhibit noise propagation.

A substance with a lower dielectric constant tends to have a higher dielectric voltage. For this reason, the low-dielectric layer 103 can provide higher insulation between the sending resonator 106 and the reception resonator 107. Appropriate selection of the material for the low-dielectric layer 103 suppresses fluctuations in dielectric constant and fluctuations in resonance frequency caused by, for example, intrusion of water. This allows improvement in the environmental durability of the electromagnetic resonance coupler 100.

Note that since the electromagnetic resonance coupler 100 has the low-dielectric layer 103, electric field coupling is assumed to be weaker than a conventional electromagnetic resonance coupler. The low-dielectric layer 103, however, does not affect magnetic field coupling. For this reason, a coupling coefficient is affected by the electric field coupling alone. Transmission efficiency $f_m$ in the electromagnetic resonance coupler 100 is represented by Equation (1) below using a coupling coefficient k, a Q-value $Q_1$ of the first resonance wire 108, and a Q-value $Q_2$ of the second resonance wire 109:

$$f_m = k\sqrt{Q_1 \cdot Q_2} \tag{1}$$

In signal transmission using electromagnetic resonant coupling, large Q-values allow achievement of high efficiency even if the coupling coefficient k is small. Thus, high transmission efficiency between the resonators can be ensured in the electromagnetic resonance coupler 100.

[Various Modifications]

Figure 5:
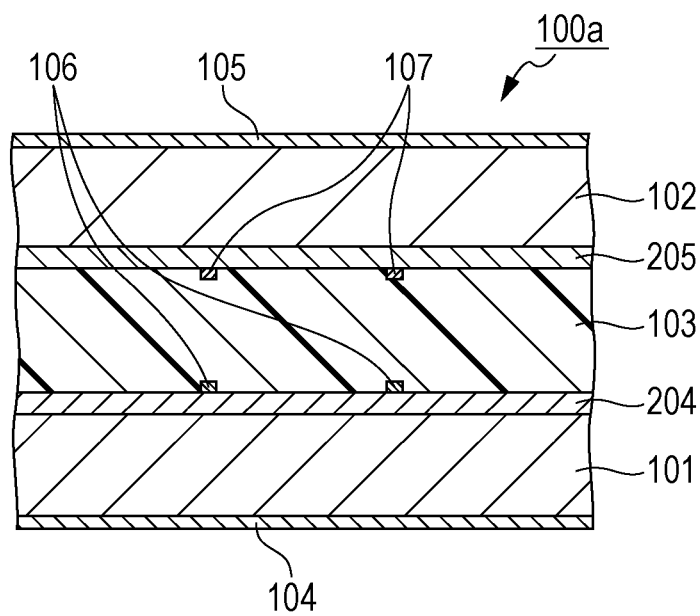
FIG. 5 is a cross-sectional view of an electromagnetic resonance coupler according to a first modification of the first embodiment.

An electromagnetic resonance coupler 100a shown in FIG. 5 includes a high-dielectric layer 204 on an upper surface of the sending substrate 101 and a high-dielectric layer 205 on a lower surface of the reception substrate 102. For example, the sending resonator 106 is disposed on an upper surface of the high-dielectric layer 204, and the reception resonator 107 is disposed on a lower surface of the high-dielectric layer 205.

The high-dielectric layer 204 and the high-dielectric layer 205 may be, for example, $TiO_2$ films having dielectric constants of 100 and thicknesses of 2 μm. In this case, a wavelength shortening effect of about 3% is obtained. That is, the wiring length of each resonance wire is made shorter by about 3%, and size reduction is achieved. Alternatively, an operating frequency can be designed to be lower by about 3% while the wring length is maintained.

In the electromagnetic resonance coupler 100a, most of a radio-frequency electric field is applied to the low-dielectric layer 103. For this reason, the dielectric dissipation factors of the high-dielectric layer 204 and the high-dielectric layer 205 may be lower than that of the low-dielectric layer 103.

Figure 6:
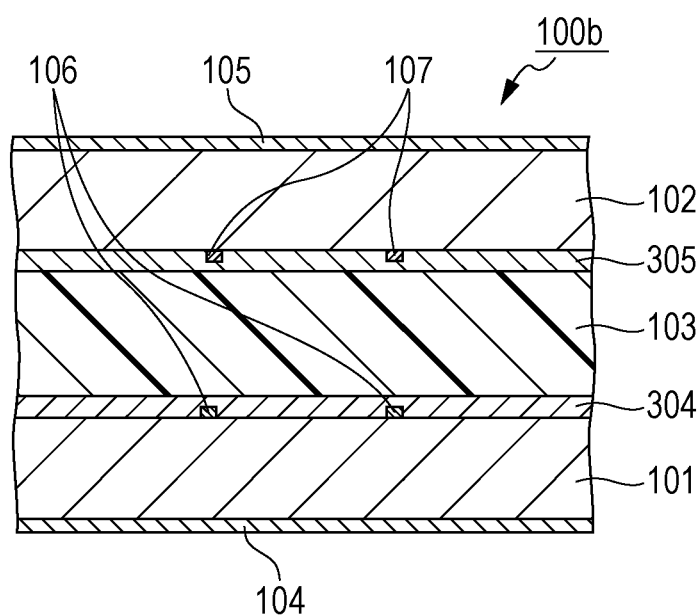
FIG. 6 is a cross-sectional view of an electromagnetic resonance coupler according to a second modification of the first embodiment.

Like an electromagnetic resonance coupler 100b shown in FIG. 6, a high-dielectric layer 304 may cover the sending resonator 106 that is disposed on an upper surface of the sending substrate 101, and a high-dielectric layer 305 may cover the reception resonator 107 that is disposed on a lower surface of the reception substrate 102.

Figure 7:
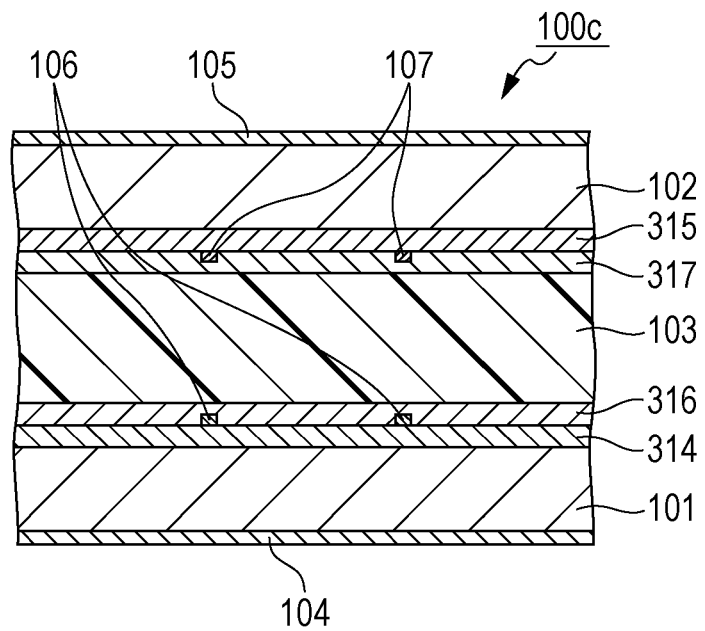
FIG. 7 is a cross-sectional view of an electromagnetic resonance coupler according to a third modification of the first embodiment.

As shown in FIG. 7, an electromagnetic resonance coupler 100c may include a high-dielectric layer 314 which is located between the sending substrate 101 and the sending resonator 106, a high-dielectric layer 315 which is located between the reception substrate 102 and the reception resonator 107, a high-dielectric layer 316 which is located between the low-dielectric layer 103 and the sending resonator 106, and a high-dielectric layer 317 which is located between the low-dielectric layer 103 and the reception resonator 107. With this configuration, a greater wavelength shortening effect is obtained.

If the dielectric constant of each high-dielectric layer is higher than that of the low-dielectric layer 103, a wavelength shortening effect is obtained. If the dielectric constant of the high-dielectric layer is higher than that of the sending substrate 101 and that of the reception substrate 102, a greater wavelength shortening effect is obtained.

Figure 8:
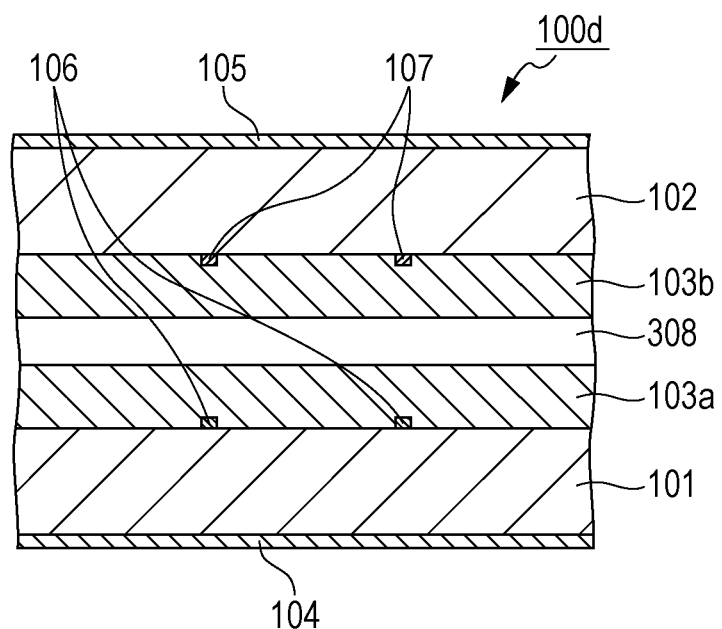
FIG. 8 is a cross-sectional view of an electromagnetic resonance coupler according to a fourth modification of the first embodiment.

An electromagnetic resonance coupler 100d shown in FIG. 8 includes a low-dielectric layer 103a, an air layer 308, and a low-dielectric layer 103b in this order between the sending resonator 106 and the reception resonator 107. With this configuration, noise propagation is further inhibited, and an excellent dielectric dissipation factor is obtained.

Figure 9:
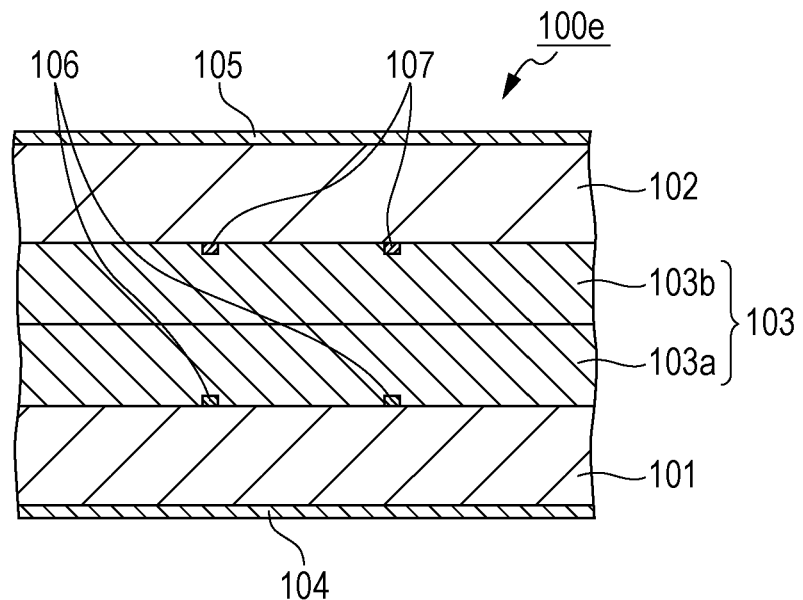
FIG. 9 is a cross-sectional view of an electromagnetic resonance coupler according to a fifth modification of the first embodiment.

In an electromagnetic resonance coupler 100e shown in FIG. 9, the low-dielectric layer 103 is composed of two layers, the low-dielectric layer 103a and the low-dielectric layer 103b that are equal in dielectric constant. With this configuration, an electric discharge between the sending substrate 101 and the reception substrate 102 can be inhibited.

Second Embodiment

Figure 10:
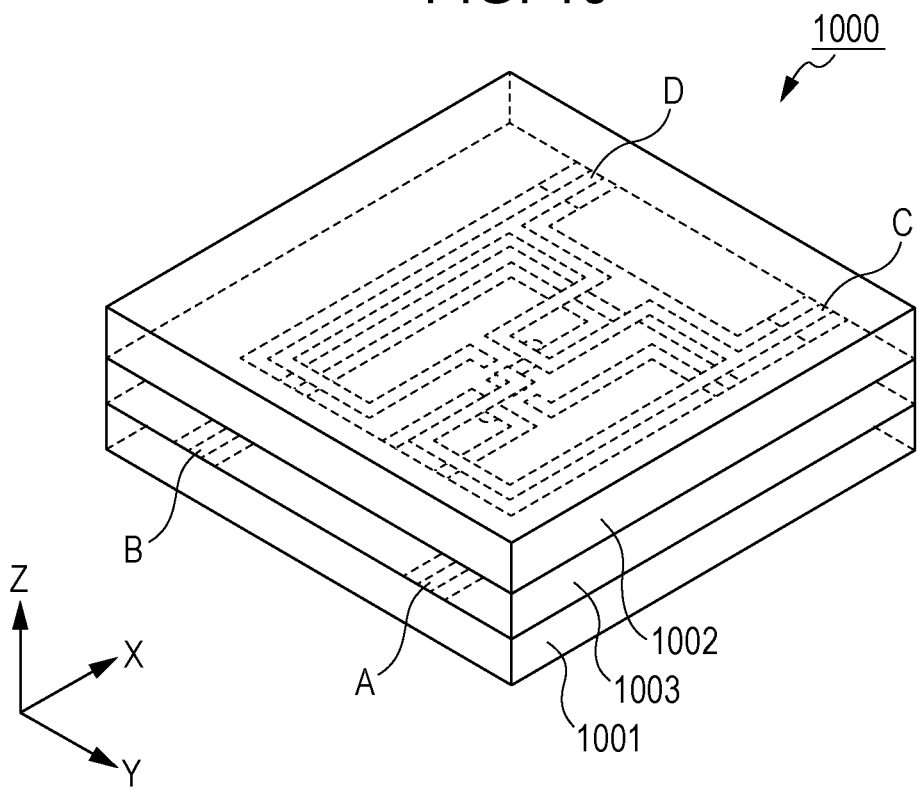
FIG. 10 is a perspective view showing an example of the configuration of an electromagnetic resonance coupler according to a second embodiment.

An electromagnetic resonance coupler according to a second embodiment will be described below. FIG. 10 is a perspective view showing an example of the configuration of the electromagnetic resonance coupler according to the second embodiment.

An electromagnetic resonance coupler 1000 shown in FIG. 10 includes a sending substrate 1001, a reception substrate 1002 which is located above the sending substrate 1001, and a low-dielectric layer 1003 which is located between the sending substrate 1001 and the reception substrate 1002. The sending substrate 1001 is an example of a second layer, the reception substrate 1002 is an example of a third layer, and the low-dielectric layer 1003 is an example of a first layer.

Each resonance wire of the electromagnetic resonance coupler 1000 has five or more bent sections. In the electromagnetic resonance coupler 1000, a signal input to an input terminal A is output to an output terminal C, and a signal input to an input terminal B is output to an output terminal D.

Figure 11:
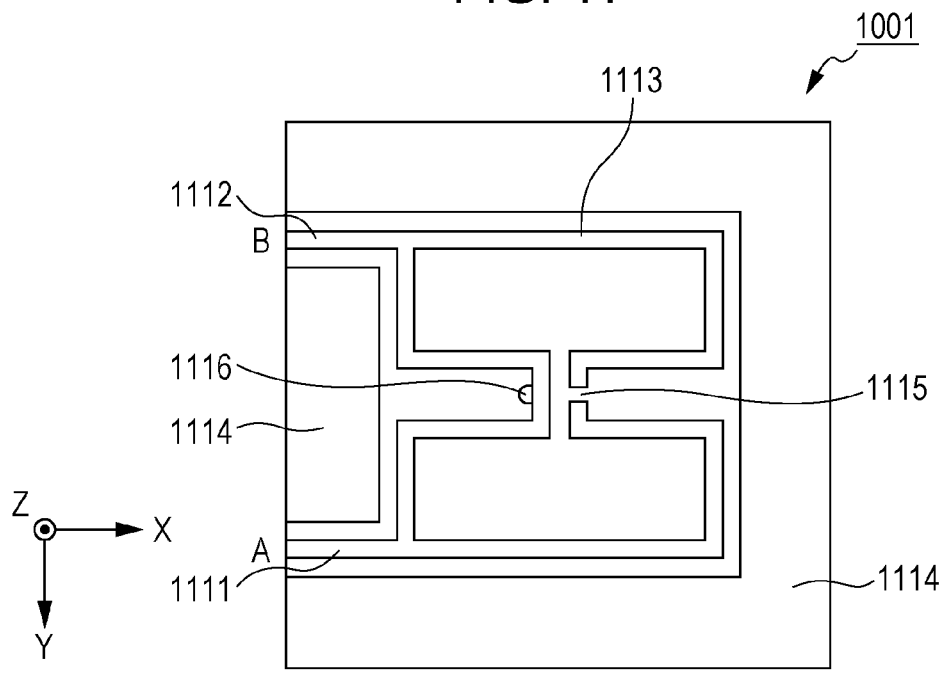
FIG. 11 is a top view of a sending substrate shown in FIG. 10.

FIG. 11 is a top view of the sending substrate 1001.

As shown in FIG. 11, a first resonance wire 1113, a first input wire 1111, and a second input wire 1112 are disposed on an upper surface of the sending substrate 1001, and the wires constitute a sending resonator. A sending-side coplanar ground 1114 is disposed around the sending resonator.

The first resonance wire 1113 has a loop shape having a total of 12 bent sections which are bent at right angles. The first resonance wire 1113 is partially opened by a sending-side slit 1115. The wiring width of the first resonance wire 1113 is, for example, 0.15 mm, and the wiring length of the first resonance wire 1113 is about one-half of an operating wavelength.

One end of the first input wire 1111 is connected to a first connection of the first resonance wire 1113. A wiring length from one end of the first resonance wire 1113 to the first connection corresponds to three-eighths of the overall wiring length of the first resonance wire 1113. One end of the second input wire 1112 is connected to a second connection of the first resonance wire 1113. A wiring length from the one end of the first resonance wire 1113 to the second connection corresponds to five-eighths of the overall wiring length of the first resonance wire 1113.

The other end of the first input wire 1111 is the input terminal A, and the other end of the second input wire 1112 is the input terminal B. The wiring widths of the first input wire 1111 and the second input wire 1112 are, for example, 0.2 mm.

The sending-side coplanar ground 1114 is disposed around and spaced from the first input wire 1111, the second input wire 1112, and the first resonance wire 1113.

The first resonance wire 1113 is connected via a via 1116 to a planar ground which is disposed on a lower surface of the sending substrate 1001. A wiring length from the one end of the first resonance wire 1113 to a grounded section of the first resonance wire 1113 corresponds to one-half of the overall wiring length of the first resonance wire 1113.

The sending-side coplanar ground 1114 and the sending-side planar ground are metal films and are made of, for example, gold. The grounds give a signal reference potential to the wires on the sending substrate 1001.

Figure 12:
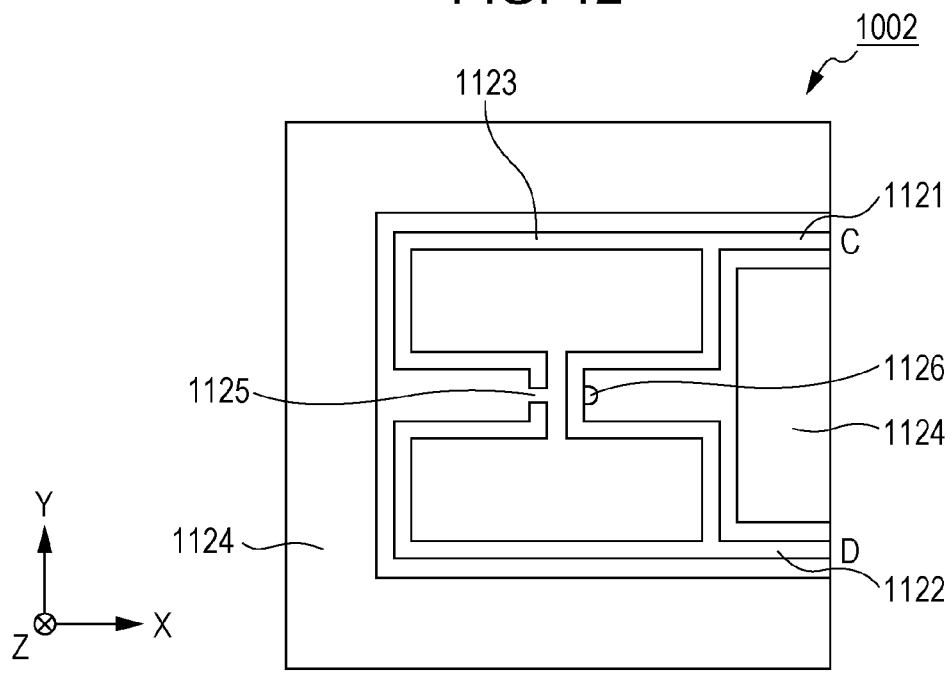
FIG. 12 is a bottom view of a reception substrate shown in FIG. 10.

FIG. 12 is a bottom view of the reception substrate 1002.

As shown in FIG. 12, a second resonance wire 1123, a first output wire 1121, and a second output wire 1122 are disposed on a lower surface of the reception substrate 1002, and the wires constitute a reception resonator. A receiving-side coplanar ground 1124 is disposed around the reception resonator.

The reception substrate 1002 has the same configuration as the sending substrate 1001, and a description thereof will be omitted. The second resonance wire 1123 is partially opened by a receiving-side slit 1125.

The other end of the first output wire 1121 is the output terminal C, and the other end of the second output wire 1122 is the output terminal D.

The receiving-side coplanar ground 1124 is disposed around and spaced from the first output wire 1121, the second output wire 1122, and the second resonance wire 1123.

The second resonance wire 1123 is connected via a via 1126 to a planar ground which is disposed on an upper surface of the reception substrate 1002.

The receiving-side coplanar ground 1124 and the receiving-side planar ground are metal films and are made of, for example, gold. The grounds give a signal reference potential to the wires on the reception substrate 1002.

The receiving-side coplanar ground 1124 and the receiving-side planar ground are isolated from the sending-side coplanar ground 1114 and the sending-side planar ground.

In the example shown in FIG. 10, contours of the first resonance wire 1113 and contours of the second resonance wire 1123 coincide with each other except for the slits and the connections when viewed from a direction perpendicular to a principal surface of the sending substrate 1001. The first resonance wire 1113 and the second resonance wire 1123 are symmetric with respect to a point when viewed from the direction perpendicular to the principal surface of the sending substrate 1001.

The electromagnetic resonance coupler 1000 has the advantages below over the electromagnetic resonance coupler 100.

In the electromagnetic resonance coupler 1000, each resonance wire is connected to ground via a via, which allows transmission of one transmission signal with a resonance wire having a length one-fourth of the operating wavelength. That is, the electromagnetic resonance coupler 1000 is suitable for miniaturization.

When viewed from the direction perpendicular to the principal surface of the sending substrate 1001, each resonance wire includes recessed wires which are bent toward an inside of a region occupied by the resonance wire. Dense arrangement of wires increases an inductance component. Dense arrangement of wires near a slit increases a capacitance component. For this reason, an operating frequency of the electromagnetic resonance coupler 1000 can have a reduced operating frequency and be suitable for miniaturization.

Since the electromagnetic resonance coupler 1000 includes the low-dielectric layer 1003, propagation of noise, such as common mode noise, can be inhibited, as in the electromagnetic resonance coupler 100.

Figure 13:
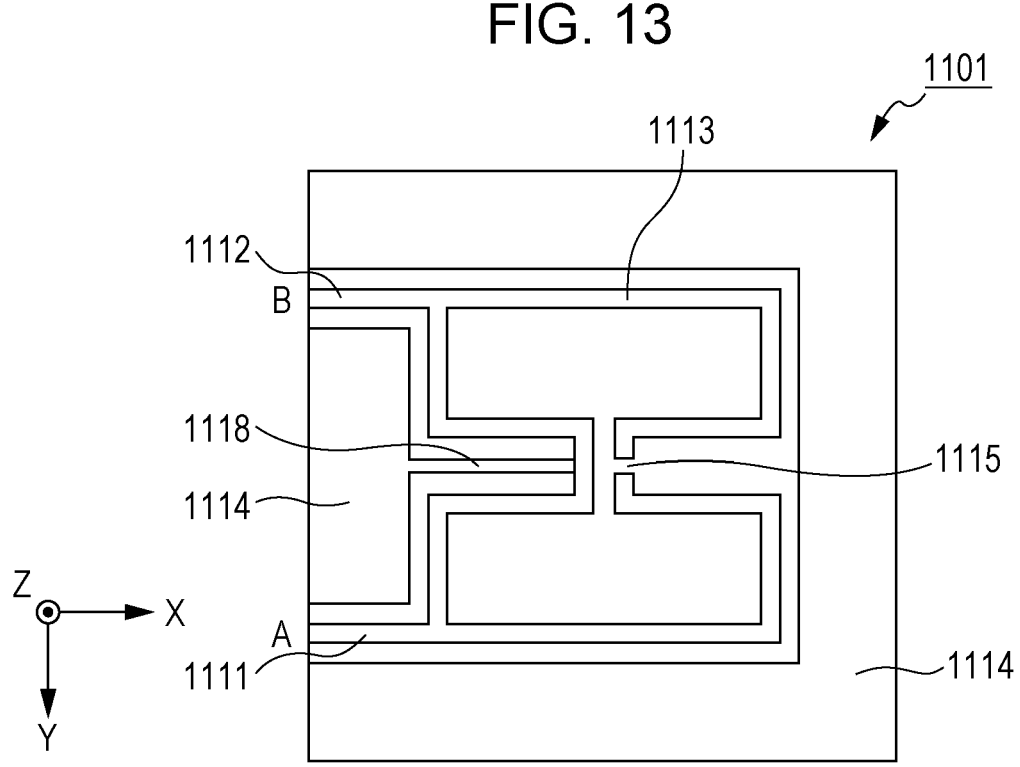
FIG. 13 is a top view of a sending substrate according to a first modification of the second embodiment.

Note that the first resonance wire 1113 may be connected to ground via a wire instead of the via 1116. FIG. 13 shows a top view of the sending substrate 1101, in which the first resonance wire 1113 is connected to the sending-side coplanar ground 1114 via a distribution wire 1118.

Third Embodiment

Figure 14:
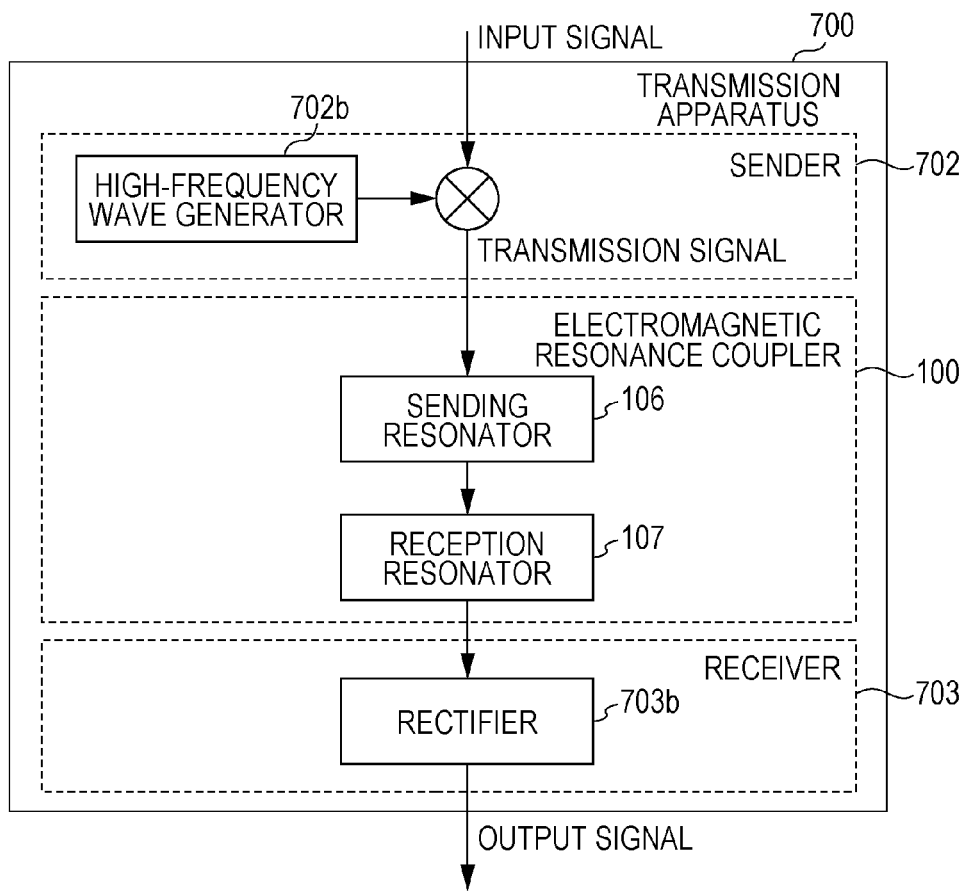
FIG. 14 is a block diagram showing an example of the configuration of a transmission apparatus according to a third embodiment.

In a third embodiment, a transmission apparatus having an electromagnetic resonance coupler as described above will be described. FIG. 14 is a block diagram showing an example of the configuration of the transmission apparatus according to the third embodiment.

As shown in FIG. 14, a transmission apparatus 700 includes an electromagnetic resonance coupler 100, a sender 702, and a receiver 703.

The sender 702 has a radio-frequency wave generator 702b which generates a radio-frequency wave. The radio-frequency wave generator 702b is, for example, an oscillator. Note that a radio-frequency wave refers to an electromagnetic wave having a frequency of 1 MHz or more. The sender 702 may include a modulator, a switching circuit, an amplifier, and the like besides the radio-frequency wave generator 702b.

The sender 702 modulates a radio-frequency wave generated by the radio-frequency wave generator 702b in accordance with an input signal, thereby generating a transmission signal. The transmission signal is input to an input terminal A of a sending resonator 106.

The transmission signal is transmitted from the sending resonator 106 to a reception resonator 107 and then is output from an output terminal B of the reception resonator 107.

The receiver 703 has a rectifier 703b. The rectifier 703b rectifies the transmission signal. In other words, the rectifier 703b demodulates the transmission signal, thereby generating an output signal. The rectifier 703b includes, for example, a diode and a capacitor.

Each of the sender 702 and the receiver 703 may be, for example, an integrated circuit using a semiconductor. The sender 702 and the receiver 703 may each be made of, for example, a material, such as silicon, gallium arsenide, or gallium nitride.

In this transmission apparatus 700, propagation of noise from an input side to an output side can be inhibited.

Simulation Result

As for the inhibitory effect on noise propagation described in the embodiments, a simulation result will be presented.

Figure 15:
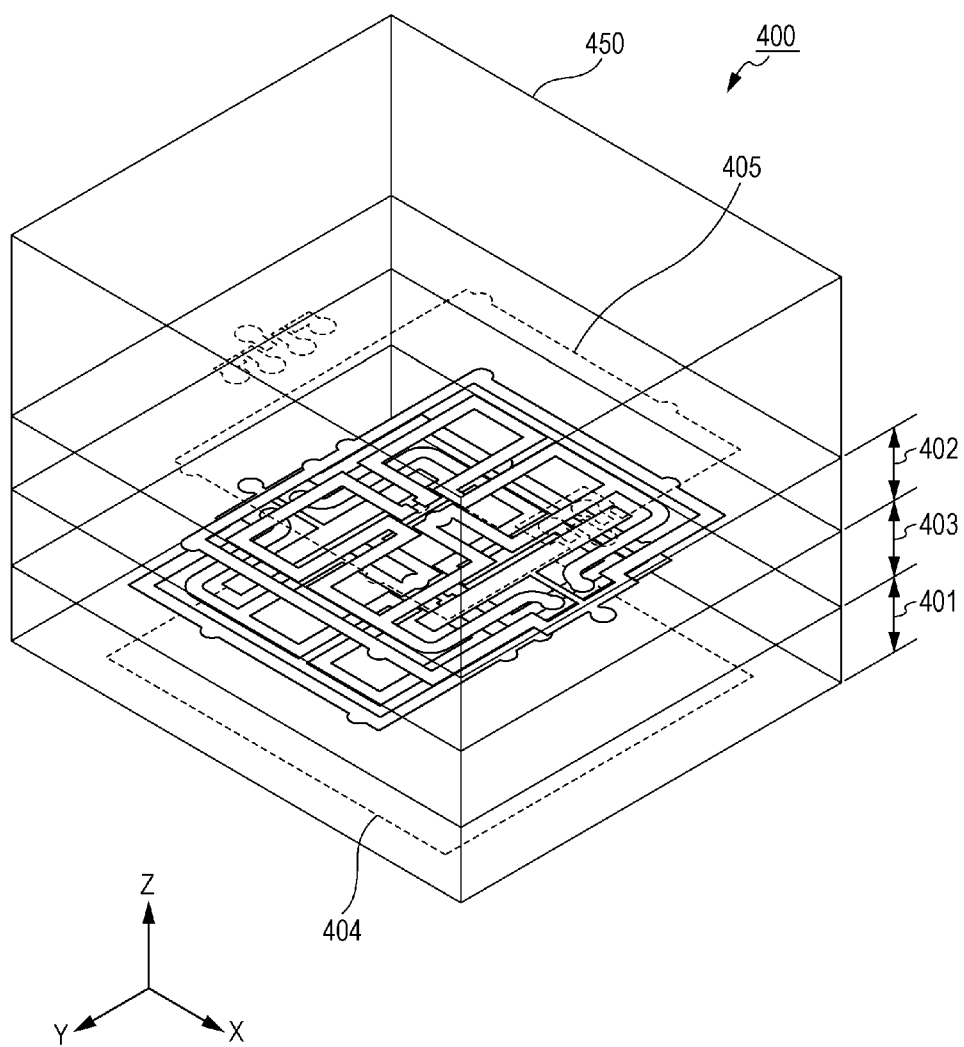
FIG. 15 is a perspective view of an electromagnetic resonance coupler as a simulation model.
Figure 16:
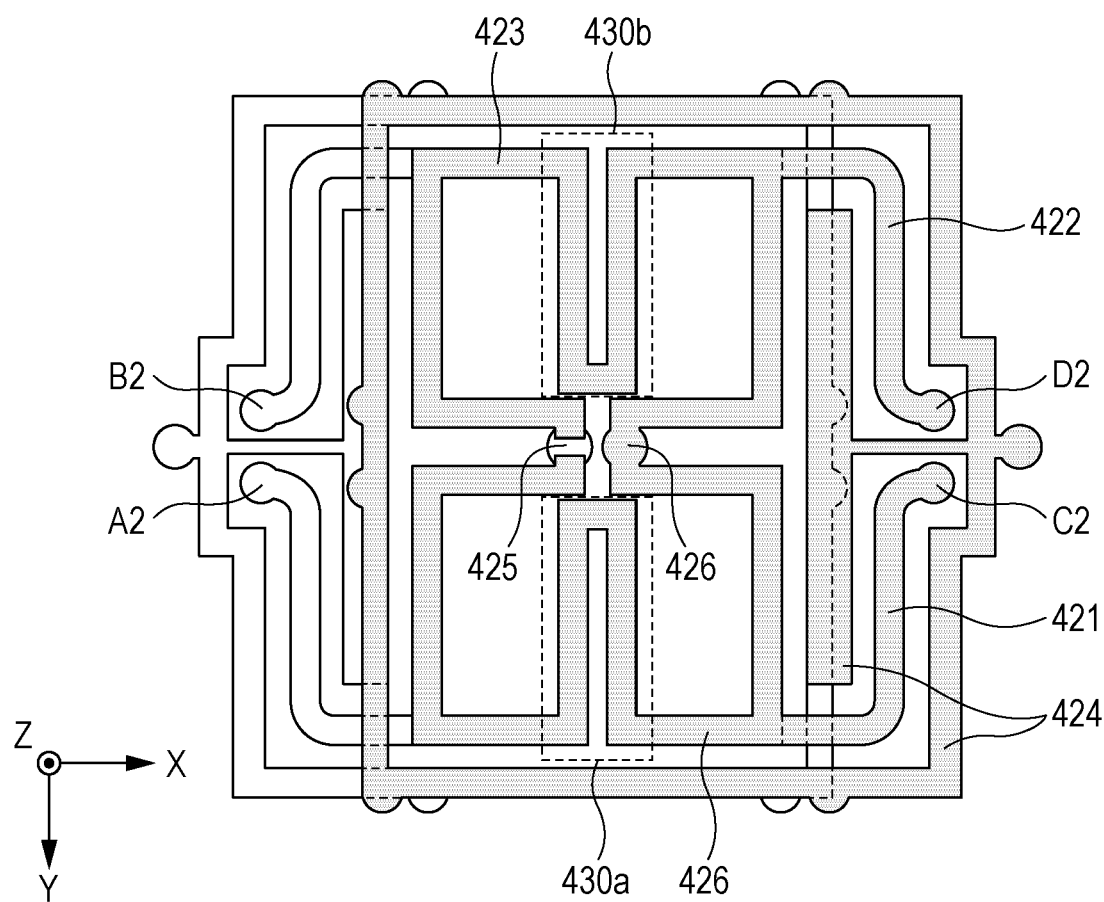
FIG. 16 is a top view showing a wiring pattern of a sending substrate and a wiring pattern of a reception substrate of the electromagnetic resonance coupler as the simulation model.

The configuration of an electromagnetic resonance coupler used in a simulation will be described first. FIG. 15 is a perspective view of an electromagnetic resonance coupler 400 as a simulation model. FIG. 16 is a top view showing a wiring pattern on a sending substrate and a wiring pattern on a reception substrate in the electromagnetic resonance coupler 400 as the simulation model.

Referring to FIG. 15, a wiring pattern on an upper surface of a sending substrate 401 and a wiring pattern on a lower surface of a reception substrate 402 are indicated by solid lines. In FIG. 15, a wiring pattern on a lower surface of the sending substrate 401 and a wiring pattern on an upper surface of the reception substrate 402 are indicated by broken lines. To clearly show the wiring patterns, the sending substrate 401, the reception substrate 402, a low-dielectric layer 403, and a metal housing 450 are transparently shown in FIG. 15.

Referring to FIG. 16, the wiring pattern on the upper surface of the sending substrate 401 is shown in black-bordered white while the wiring pattern on the lower surface of the reception substrate 402 is hatched.

The electromagnetic resonance coupler 400 includes the sending substrate 401, the reception substrate 402, and the low-dielectric layer 403 that is located between the sending substrate 401 and the reception substrate 402. A planar ground 404 is arranged on the lower surface of the sending substrate 401, and a planar ground 405 is arranged on the upper surface of the reception substrate 402.

The structures of resonators of the electromagnetic resonance coupler 400 are similar to those of the resonators of the electromagnetic resonance coupler 1000 described above. More specifically, in the electromagnetic resonance coupler 400, a signal input to an input terminal A2 is output to an output terminal C2 while a signal input to an input terminal B2 is output to an output terminal D2.

A second resonance wire 423, a first output wire 421, and a second output wire 422 correspond to the second resonance wire 1123, the first output wire 1121, and the second output wire 1122, respectively, though the wires are different in detailed wiring pattern. A receiving-side coplanar ground 424, a receiving-side slit 425, and a via 426 correspond to the receiving-side coplanar ground 1124, the receiving-side slit 1125, and the via 1126, respectively. The sending substrate 401 has the same correspondence, and a description thereof will be omitted.

Wires on the upper surface of the sending substrate 401 and the planar ground 404 are connected via a plurality of vias at a plurality of points. Wires on the lower surface of the reception substrate 402 and the planar ground 405 are connected via a plurality of vias at a plurality of points. The vias are not shown in FIG. 15.

The second resonance wire 423 is different from the second resonance wire 1123 in that the second resonance wire 423 further includes two recessed wires 430a and 430b. With the dense arrangement of wires, the electromagnetic resonance coupler 400 achieves further reduction in operating frequency.

Contours of a first resonance wire and contours of the second resonance wire 423 coincide with each other when the electromagnetic resonance coupler 400 is viewed from a direction perpendicular to a principal surface of the sending substrate 401. The first resonance wire and the second resonance wire 423 are symmetric with respect to a point.

Referring to FIG. 15, the electromagnetic resonance coupler 400 includes the metal housing 450 in the shape of a rectangular parallelepiped that surrounds the sending substrate 401, the reception substrate 402, and the low-dielectric layer 403.

The present inventors performed the simulation below in the electromagnetic resonance coupler 400. Note that the thicknesses of the sending substrate 401, the reception substrate 402, and the low-dielectric layer 403 were all 2.8 mm in the simulation.

(1) An input signal Vin was input to a terminal, into which the input terminal A2, the input terminal B2, and a ground wire on the sending substrate 401 side, including the planar ground 404, were tied together. The input signal Vin was a 1500 V/50 ns input signal Vin with a pulse width of 0.5 μs, in which common mode noise was assumed to be generated. The rate of rise of the input signal Vin corresponds to, for example, the rate of rise of a 30 kV/μs signal. A reference potential of the input signal Vin was equal to the potential of a ground of a device which applies the input signal Vin, and the metal housing 450 was connected to the ground of the device that applies the input signal Vin.

(2) When the input signal Vin was applied to the sending-side terminal, an output signal Vout is output from a terminal, into which the output terminal C2, the output terminal D2, and a ground wire on the reception substrate 402 side, including the planar ground 405, were tied together. A voltage value of the output signal Vout was measured using a 10-Ω resistor which is connected to the receiving-side terminal.

The above-described simulation was performed while varying the dielectric constant of the low-dielectric layer 403 alone. Results obtained from the simulation will be described.

Figure 17:
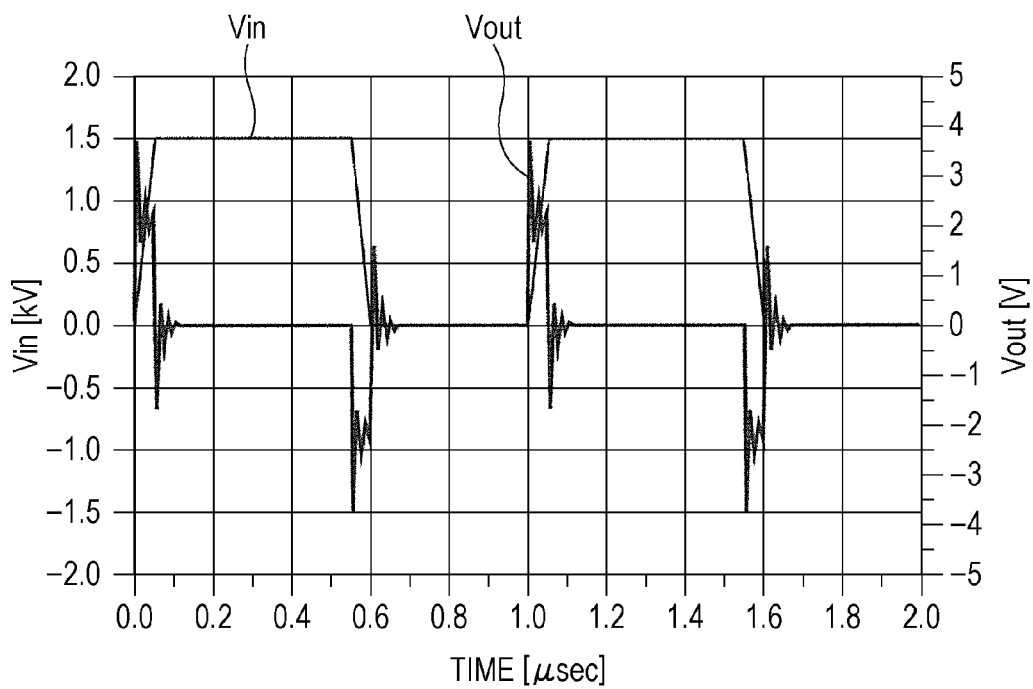
FIG. 17 is a graph showing the relationship between an input signal Vin and an output signal Vout in case 1.

The relationship between the input signal Vin and the output signal Vout in a case where the dielectric constant of the sending substrate 401, the dielectric constant of the reception substrate 402, and the dielectric constant of the low-dielectric layer 403 were all 10 (hereinafter also referred to as case 1) is shown in FIG. 17.

As shown in FIG. 17, in case 1, the peak voltage of the output signal Vout was about 3.7 V.

Figure 18:
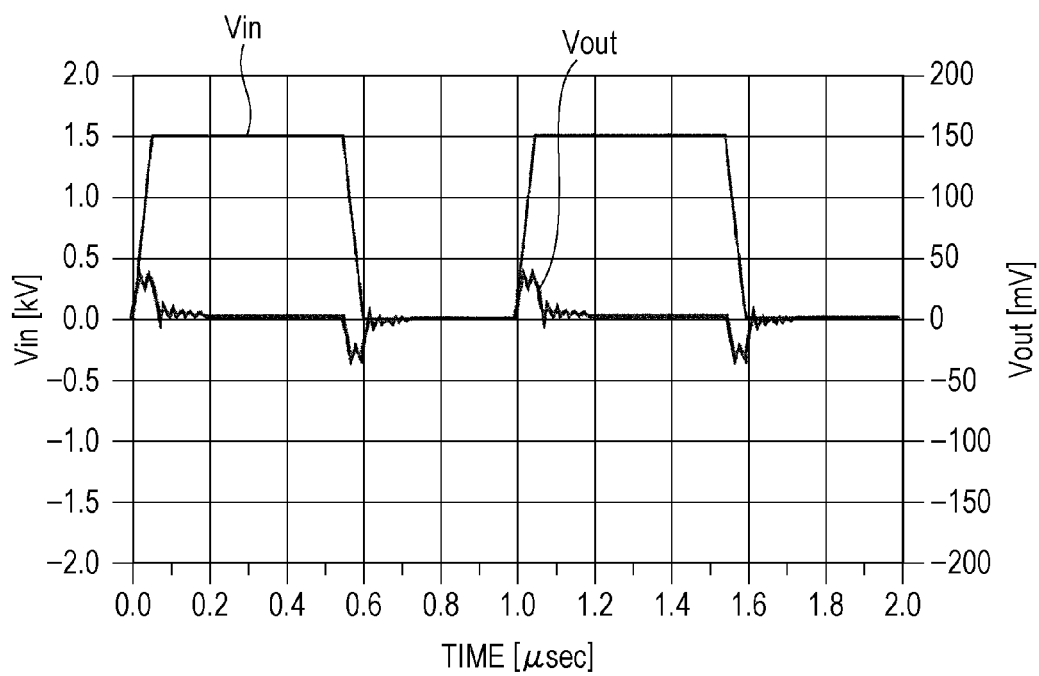
FIG. 18 is a graph showing the relationship between the input signal Vin and the output signal Vout in case 2.

The relationship between the input signal Vin and the output signal Vout in a case where the dielectric constant of the sending substrate 401 and the dielectric constant of the reception substrate 402 were 10, and the dielectric constant of the low-dielectric layer 403 was 3.4 (hereinafter also referred to as case 2) is shown in FIG. 18.

As shown in FIG. 18, in case 2, the peak voltage of the output signal Vout was about 0.038 V. That is, noise propagation was reduced in case 2 to about one-hundredth of that in case 1.

Figure 19:
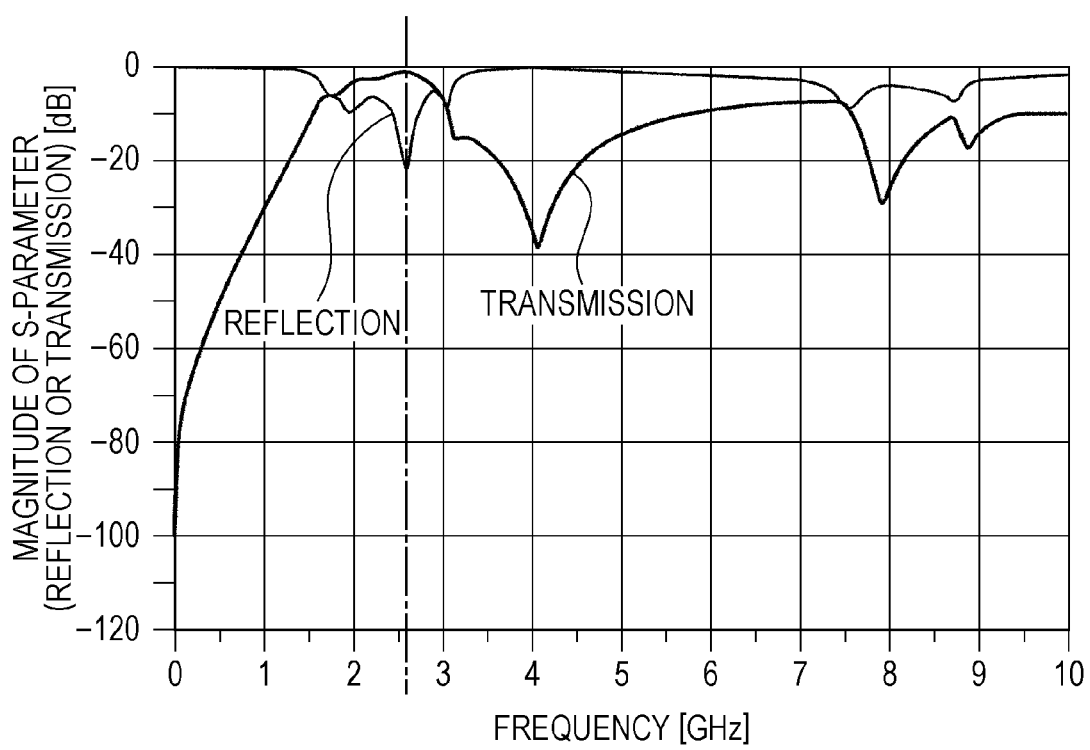
FIG. 19 is a graph showing S-parameters, i.e., a reflection coefficient and a transmission coefficient, in case 1.
Figure 20:
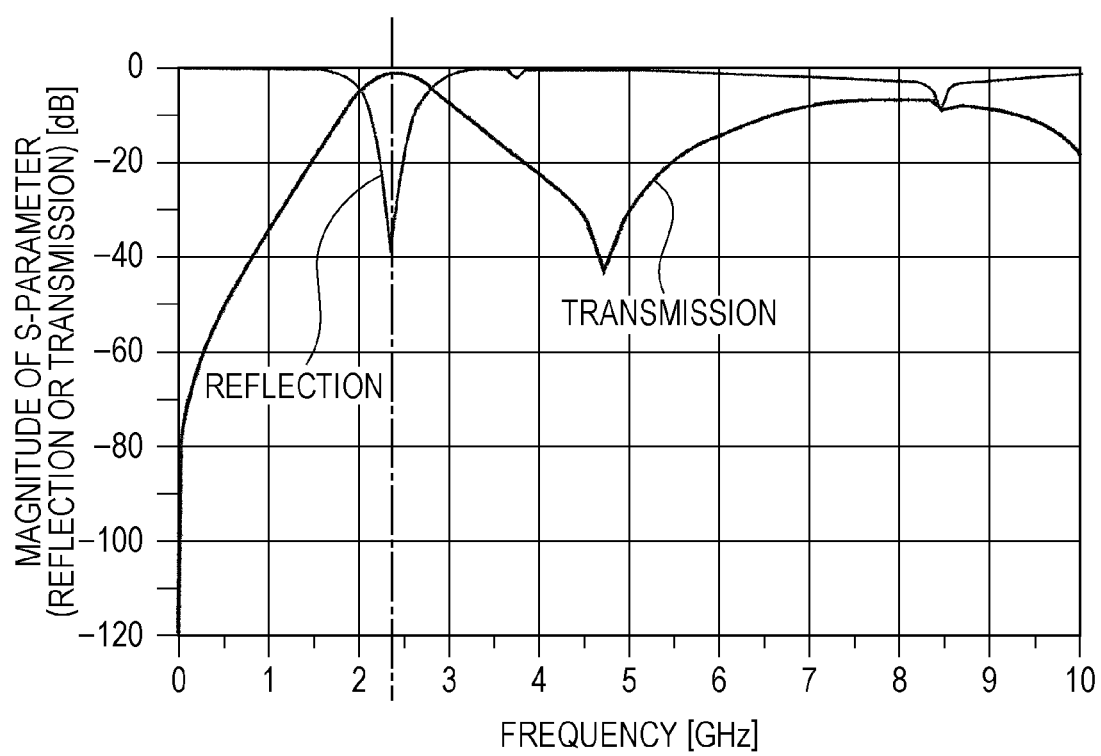
FIG. 20 is a graph showing S-parameters, i.e., a reflection coefficient and a transmission coefficient, in case 2.

It will be explained that the signal transmission performance in the electromagnetic resonance coupler 400 was ensured in case 2. FIG. 19 shows S-parameters, i.e., a reflection coefficient and a transmission coefficient, in case 1. FIG. 20 shows S-parameters, i.e., a reflection coefficient and a transmission coefficient, in case 2.

As shown in FIG. 19, in case 1, the transmission coefficient at 2.57 GHz was −1.2 dB. That is, the transmission coefficient was satisfactory at and around 2.4 GHz that was assumed as the operating frequency of the electromagnetic resonance coupler 400. Note that a 3 dB bandwidth was 0.8 GHz (a band from 2.0 GHz to 2.8 GHz).

As shown in FIG. 20, in case 2, the transmission coefficient at 2.39 GHz was −1.1 dB. That is, the transmission coefficient was satisfactory at and around 2.4 GHz that was assumed as the operating frequency of the electromagnetic resonance coupler 400. Note that a 3 dB bandwidth in case 2 was 0.6 GHz (a band from 2.1 GHz to 2.7 GHz). The 3 dB bandwidth in case 2 is slightly narrower than in case 1 but causes no problem with operation.

The same simulation was performed without connecting the metal housing 450 and the ground of the device that applies the input signal Vin. In this case, the output signal Vout in case 2 was about one-third of the output signal Vout in case 1. That is, a noise propagation reduction effect can be obtained even in this case.

Note that although the electromagnetic resonance coupler 400 is different in structure from the various electromagnetic resonance couplers described in the first and second embodiments, the same results are expected to be obtained in these electromagnetic resonance couplers.

Other Embodiments

As described above, the various embodiments have been described as examples of a technique to be disclosed in the present disclosure. However, appropriate changes, substitutions, additions, omissions, combinations, and the like may be made in the various embodiments. These forms are also included in the present disclosure.

A dielectric voltage between a sending substrate and a reception substrate depends mainly on the material for a low-dielectric layer sandwiched between the sending substrate and the reception substrate. The low-dielectric layer preferably withstands a transmission signal peak-to-peak voltage for transmitting a signal or power, and a substrate with a relatively low dielectric voltage may be used as the low-dielectric layer.

Since the dielectric voltage of an electromagnetic resonance coupler depends mainly on the material for a low-dielectric layer, the materials for and the thicknesses of a reception substrate, a sending substrate, and a high-dielectric layer can be appropriately selected.

For example, a sending substrate and a reception substrate may be thin, and a low-dielectric layer to be sandwiched between the substrates may have a thickness which satisfies a dielectric voltage specification. This configuration allows reduction in the cost of the materials for the sending substrate and the reception substrate.

Any other layer, such as an air layer or a low-dielectric layer, may be located between a sending substrate and a planar ground. This configuration allows achievement of input impedance matching. Any other layer, such as an air layer or a low-dielectric layer, may be located between a reception substrate and a planar ground. This configuration allows achievement of output impedance matching.

Although the above-described embodiment has described that a resin material mixed with a filler is used in a low-dielectric layer, a low-dielectric layer is not limited to this material. For example, a material higher in dielectric dissipation factor than a sending substrate (or a reception substrate) may be used as the material for a low-dielectric layer.

The shape of a first resonance wire may be substantially identical to that of a second resonance wire. That is, the shape of the first resonance wire may not be completely identical to that of the second resonance wire.

For example, a designer may make some changes to the shape of at least one of a first resonance wire and a second resonance wire to adjust a frequency band for a transmission signal.

The shapes of and the positional relationship between a first resonance wire and a second resonance wire may be such that the first resonance wire and the second resonance wire couple together through electromagnetic resonant coupling to allow contactless signal transmission.

To inhibit noise propagation, the area of a planar ground may be cut.

An electromagnetic resonance coupler according to the present disclosure is applicable to a gate driving apparatus in, for example, an inverter system or a matrix converter system.

While the present disclosure has been described with respect to exemplary embodiments thereof, it will be apparent to those skilled in the art that the disclosure may be modified in numerous ways and may assume many embodiments other than those specifically described above. Accordingly, it is intended by the appended claims to cover all modifications of the disclosure that fall within the true spirit and scope of the disclosure.

What is claimed is:

1. An electromagnetic resonance coupler comprising:
    a first layer including a first principal surface and a second principal surface opposite to the first principal surface, the first layer having a first dielectric constant and a first dielectric dissipation factor;
    a second layer facing the first principal surface of the first layer, the second layer having a second dielectric constant higher than the first dielectric constant and a second dielectric dissipation factor lower than the first dielectric constant;
    a third layer facing the second principal surface of the first layer, the third layer having a third dielectric constant higher than the first dielectric constant and a third dielectric dissipation factor lower than the first dielectric constant;
    a first resonator located between the first layer and the second layer, the first resonator having a planar shape; and
    a second resonator located between the first layer and the third layer, the second resonator having a planar shape.

2. The electromagnetic resonance coupler according to claim 1, wherein the first layer, the second layer, and the third layer are dielectric layers.

3. The electromagnetic resonance coupler according to claim 1, wherein the first dielectric constant is higher than 1.

4. The electromagnetic resonance coupler according to claim 1, wherein
    the second layer includes a second resin layer and a second filler dispersed in the second resin layer, the second filler being higher in dielectric constant than the second resin layer, and
    the third layer includes a third resin layer and a third filler dispersed in the third resin layer, the third filler being higher in dielectric constant than the third resin layer.

5. The electromagnetic resonance coupler according to claim 4, wherein the first layer includes a first resin layer and does not include a filler.

6. The electromagnetic resonance coupler according to claim 1, wherein
    the first layer includes a first resin layer and a first filler dispersed in the first resin layer, the first filler being higher in dielectric constant than the first resin layer,
    the second layer includes a second resin layer and a second filler dispersed in the second resin layer, the second filler being higher in dielectric constant than the second resin layer,
    the third layer includes a third resin layer and a third filler dispersed in the third resin layer, the third filler being higher in dielectric constant than the third resin layer, and
    a first volume fraction of the first filler in the first layer is smaller than either one of a second volume fraction of the second filler in the second layer and a third volume fraction of the third filler in the third layer.

7. The electromagnetic resonance coupler according to claim 1, wherein
    the electromagnetic resonance coupler operative to isolatedly transmit a transmission signal from one of the first resonator and the second resonator to the other of the first resonator and the second resonator, and
    a distance between the first resonator and the second resonator is not more than one-half of a wavelength of the transmission signal.

8. The electromagnetic resonance coupler according to claim 1, wherein the first layer includes a plurality of dielectric layers.

9. The electromagnetic resonance coupler according to claim 1, further comprising:
    at least one dielectric layer located at least one of a position between the first layer and the first resonator, a position between the second layer and the first resonator, a position between the first layer and the second resonator, and a position between the third layer and the second resonator, the at least one dielectric layer having a dielectric constant higher than the first dielectric constant.

10. The electromagnetic resonance coupler according to claim 1, further comprising:
    a first ground layer facing the second layer, the second layer located between the first ground layer and the first layer; and
    a second ground layer facing the third layer, the third layer located between the second ground layer and the first layer.

11. The electromagnetic resonance coupler according to claim 10, wherein
    the first resonator includes a first wire including a first connection and a second connection, a first input wire connected to the first connection, and a second input wire connected to the second connection,
    the second resonator includes a second wire including a third connection and a fourth connection, a first output wire connected to the third connection, and a second output wire connected to the fourth connection,
    the first ground is connected to the first wire at a first position between the first connection and the second connection in the first wire, and
    the second ground is connected to the second wire at a second position between the third connection and the fourth connection in the second wire.

12. The electromagnetic resonance coupler according to claim 11, wherein
    the first wire has a first loop shape which is partially open, and
    the second wire has a second loop shape which is partially open.

13. The electromagnetic resonance coupler according to claim 12, wherein
    a first outer peripheral contour of the first wire and a second outer peripheral contour of the second wire coincide with each other when viewed from a direction perpendicular to the first principal surface.

14. The electromagnetic resonance coupler according to claim 12, wherein
    the first wire and the second wire are symmetric with respect to a point when viewed from a direction perpendicular to the first principal surface.

15. A transmission apparatus comprising:
an electromagnetic resonance coupler;
a sender which generates a transmission signal by modulating a radio-frequency wave in accordance with an input signal and sends the transmission signal to the first resonator; and
a receiver which generates an output signal by rectifying the transmission signal output from the second resonator, wherein the electromagnetic resonance coupler includes:
a first layer including a first principal surface and a second principal surface opposite to the first principal surface, the first layer having a first dielectric constant and a first dielectric dissipation factor;
a second layer facing the first principal surface of the first layer, the second layer having a second dielectric constant higher than the first dielectric constant and a second dielectric dissipation factor lower than the first dielectric constant;
a third layer facing the second principal surface of the first layer, the third layer having a third dielectric constant higher than the first dielectric constant and a third dielectric dissipation factor lower than the first dielectric constant;
a first resonator located between the first layer and the second layer, the first resonator having a planar shape; and
a second resonator located between the first layer and the third layer, the second resonator having a planar shape.

* * * * *